Figure 1:
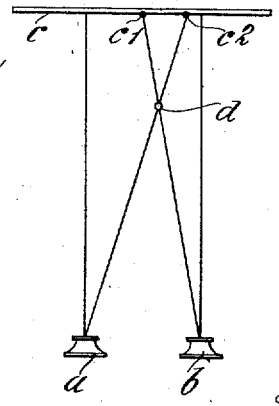

J. GILLET.

INSTRUMENT FOR DETERMINING THE POSITION OF AN ORGAN OR THE LIKE WITHIN HUMAN BODIES.

APPLICATION FILED AUG. 4, 1909.

Reissued Mar. 8, 1910.

13,089.

WITNESSES:

Julius Stahl

H. Alfred Franke

INVENTOR

Joseph Gillet

BY his ATTORNEYS

ANDREW B. GRAHAM CO., PHOTO-LITHOGRAPHERS, WASHINGTON, D. C.

UNITED STATES PATENT OFFICE.

JOSEPH GILLET, OF SCHÖNEBERG, NEAR BERLIN, GERMANY, ASSIGNOR TO SIEMENS & HALSKE, A. G., OF BERLIN, GERMANY.

INSTRUMENT FOR DETERMINING THE POSITION OF AN ORGAN OR THE LIKE WITHIN HUMAN BODIES.

13,089. Specification of Reissued Letters Patent. Reissued Mar. 8, 1910.

Original No. 870,506, dated November 5, 1907, Serial No. 382,543. Application for reissue filed August 4, 1909. Serial No. 511,262.

*To all whom it may concern:*

Be it known that I, JOSEPH GILLET, a subject of the German Emperor, and a resident of Schöneberg, near Berlin, Germany, have invented a certain new and useful Improvement in Instruments for Determining the Position of an Organ or the Like Within Human Bodies, of which the following is a specification.

The present invention relates to an instrument for determining the exact position of an organ, foreign body, size of organs to determine their pathological condition, and so on within the human body for example, which can be shown by Roentgen rays. The new instrument makes use of the Roentgen picture which is taken stereoscopically for this purpose.

It is known that two corresponding stereoscopic points can be united to one point suspended freely in space simply by the convergence of the axes of vision without the aid of optically refracting media. This can only be effected, however, when the axes of vision cross one another between the picture and the eyes, thus when the left-hand picture is seen with the right eye and the right-hand picture with the left eye. The point of intersection is then the point at which the stereoscopic picture appears.

Now the present invention is based on the following new method. In the first place two photographs are made on two different plates, or more preferably, however, on one and the same plate, of the point, foreign body organ, etc., the position of which in space is to be determined; the second of these photographs differs from the first by its being taken after the Roentgen tube has been displaced laterally a certain amount, preferably the distance of the space between the eyes, parallel to the photographic plate. The stereoscopic roentgenogram which is obtained in this manner can now be employed for determining the exact position of the body, point etc. in question, this determination being effected as follows: The investigator brings the roentgenogram into such a position that the centers of his eyes or the centers of two sights $a$, $b$, (Fig. 1) which are used for making the observation, are in the same relative position to the roentgenogram $c$ as the focus of the Roentgen tube during the exposure, and he now fixes his eyes upon the corresponding points $c^1$ $c^2$, which represent for example the foreign body, organ or the like, the position of which is to be determined, so that the visual lines cross between the picture and the eyes, that is to say, so that the right eye looks at the left-hand shadow and the left eye simultaneously looks at the right-hand shadow. The point of intersection $d$ of the visual lines corresponds exactly in its position with the place which is sought. It is simultaneously the place at which the stereoscopic picture of the two shadow pictures which are looked at distinctly appears suspended freely and tangible. If the point of an indicator, pointer or the like is used for fixing this point, said pointer or the like being displaced until its point covers the points of the picture, or in other words, until all three points unite in the one single point of intersection which is sought, the position of the point of the pointer indicates the exact position of the point which is sought for in space with respect to the photographic plate.

Figure 3:
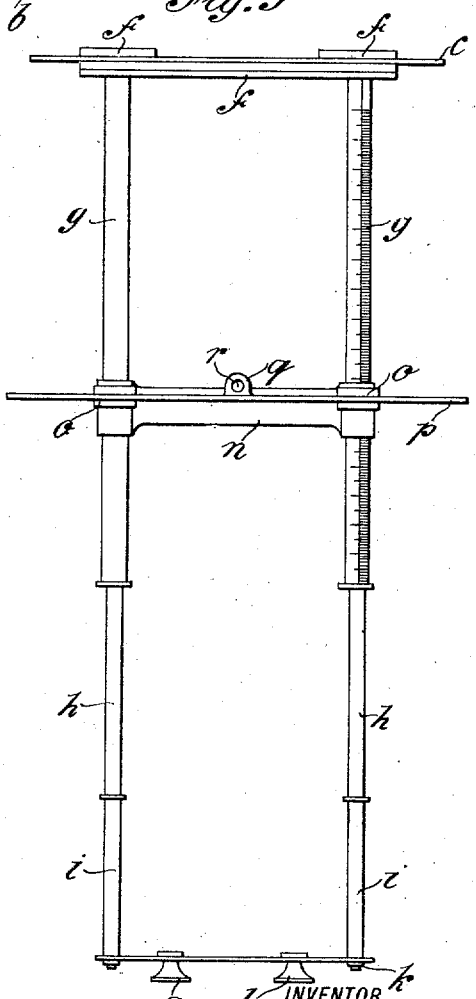
Figure 2:
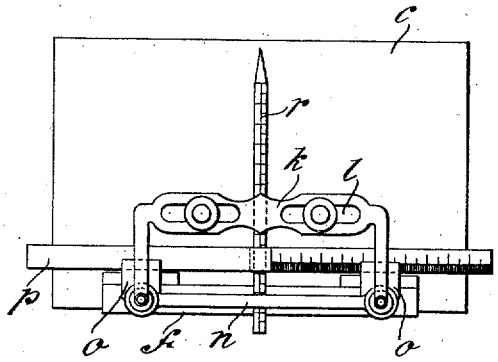

Now the present invention has for its object means for carrying this method into practice, and in order that the same may be clearly understood reference is made to the accompanying drawing in which:

Figure 1 is a diagram of sights used for looking on a plate, showing visual lines; Fig. 2 is an elevation of the new instrument in accordance with the present invention, and Fig. 3 is a plan of the same.

The apparatus consists substantially of the holder $f$ for the stereoscopic roentgenogram $c$. Two tubes $g$ are attached to the holder forming a support and guide within which the tubes $h$, $i$ are movable telescopically. The inner tubes $i$ carry a yoke $k$ with openings $l$ at their front ends, and the sights $a$, $b$, are arranged movable in these openings $l$. By the term "sights" I understand any of the well known sighting devices which tend to guide the axis of vision in a desired direction. A slide $n$ is arranged movable on the tubes $g$. This slide carries guiding forks $o$ above the tubes, in which forks a bar $p$ is displaceable at right angles to the longitudinal axis of the tubes. The bar $p$ carries in its center part a shoulder $q$ with a hole in it, within which hole the pointer $r$ which is pointed at its upper end is movable vertically. As is seen from the drawing the pointer $r$ the bar $p$, as well as one of the tubes $g$ are provided with scales so that the various positions of these parts with respect to the roentgenogram can be read on the scales.

The instrument is used in the manner already described with respect to Fig. 1. After the stereoscopic roentgenogram $c$, which has preferably been taken on only one plate, or a print of the same, has been fastened in the carrier $f$, the sights $a$, $b$ are in the first place put at the same distance from one another, as well as from the roentgenogram, as obtained when taking the picture with regard to the Roentgen tubes. The point of the pointer $r$ is then adjusted in the manner previously described so that it covers the two points of the picture which are looked at. In consequence of the pointer $r$ being capable of being moved to all sides in space this adjustment is easily brought about. The position of the point looked at, or of the point of the pointer $r$ can then be exactly read off on the scales arranged on the pointer $r$, bar $p$ and tube $g$. As the position is known which the photographic plate had with respect to the photographed object when the exposure was made, the position of the point which is sought within the photographic object can be ascertained exactly from the position of the point of the pointer $r$ with respect to the plate.

In order to ascertain the position of a foreign body in the human body employing the above described instrument, it is preferable to determine by measurement, by means of this instrument, besides the position of this foreign body that of a second point situated near the same, the position of which in the human body is known exactly to the doctor. If, for example, the position of the foreign body has been ascertained by measurement according to the three dimensions in space, as a second operation the position of the point which is known to the doctor has to be ascertained by measurement according to the three dimensions likewise with the aid of this instrument. It is then only necessary to determine the difference in the sizes of the three dimensions. The measurements thus ascertained give the position of the foreign body which is sought with regard to the position of the point known to the doctor in the human body. On the basis of these determinations the operation can then be easily and successfully conducted.

The above described instrument in accordance with the present invention can be varied in various ways. For example, it is not absolutely necessary to arrange the pointer $r$ movable vertically; on the other hand the same may be rigidly united with the slide $q$. The point of intersection of the axes of vision is then determined by the pointer $r$ being moved by means of the slides $p$ and $n$ until it crosses the points of vision. The height of this point of intersection can then be read off on the scale provided on the pointer $r$.

In order to find the point of intersection of the axes of vision or the stereoscopic image more easily it is preferable, as has already been mentioned, to make the two stereoscopic exposures with a displacement of the Roentgen tubes which corresponds to the distance between the pupils of the eyes, so that when observing the stereogram the sights $a$, $b$ can also be used with a distance between them equal to the distance between the pupils. It must, however, be emphasized that it is not always necessary to keep to this distance, but that the Roentgen pictures can also be taken with a greater distance between the tubes; in the latter case it is essential, however, that when using the instrument the sights are set at a distance apart equal to that of the Roentgen tubes which was chosen for the exposures. The point of intersection of the axes of vision is then determined by alternately determining the opposite points of vision through the sights $a$ or $b$ with one eye.

What I claim as my invention and desire to secure by Letters Patent is:

1. An instrument for determining the position of foreign bodies and organs by means of Roentgen stereograms taken stereoscopically, comprising in combination a holder for the stereogram, a support fixed to said holder a yoke carrying sights mounted on said support, and a material point mounted between said sights and said holder movable at right angles to the plane of said stereogram in said holder, as set forth.

2. An instrument for determining the position of foreign bodies and organs by means of Roentgen stereograms taken stereoscopically, comprising in combination a holder for the steregram, a support fixed on said holder, a yoke fastened to said support carrying sights, said yoke being mounted and movable at right angles to the plane of said stereogram in said holder, and a material point mounted between said sights and said holder movable at right angles to the plane of said stereogram in said holder, as set forth.

3. An instrument for determining the position of foreign bodies and organs by means of Roentgen stereograms taken stereoscopically, comprising in combination a holder for the stereogram, a support fixed on said holder, a yoke carrying sights fastened to said support, and a material point mounted between said sights and said holder movable at right angles and parallel to the plane of said stereogram in said holder, as set forth.

4. An instrument for determining the position of foreign bodies and organs by means of Roentgen stereograms taken stereoscopically, comprising in combination a holder for the stereogram, a support fixed on said holder, a yoke carrying sights fastened to said support, and a material point mounted between said sights and said holder adapted to be moved in all directions in space as set forth.

5. An instrument for determining the position of foreign bodies and organs by means of Roentgen stereograms taken stereoscopically, comprising in combination a holder for the stereogram, a support fixed on said holder, a yoke carrying sights fastened to said support, a material point mounted between said sights and said holder movable at right angles to the plane of said stereogram in said holder and means for reading by measurement the position of said material point in space as set forth.

JOSEPH GILLET.

Witnesses:
HENRY HASPER,
WOLDEMAR HAUPT.